Figure 3:
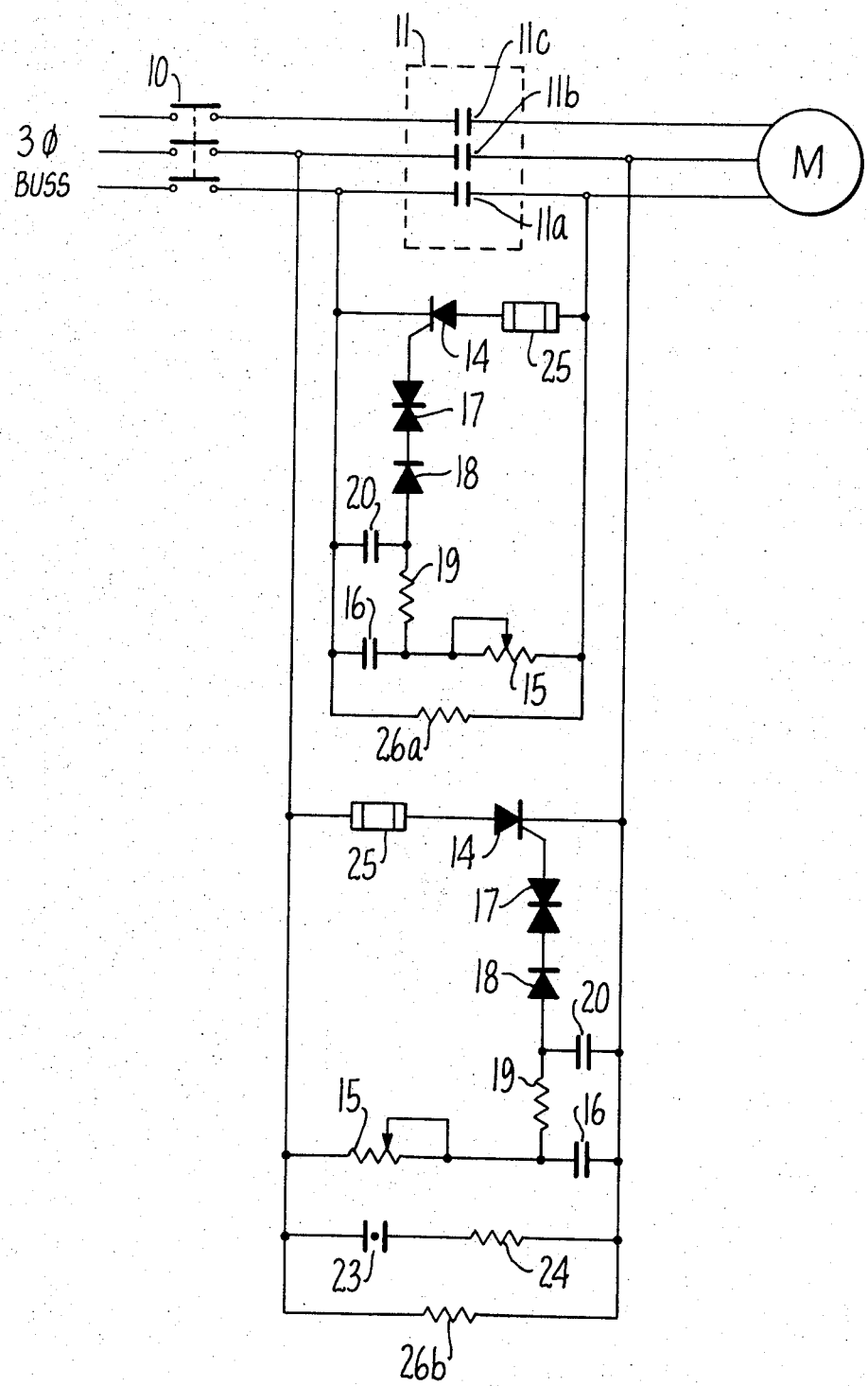

United States Patent
Dikinis et al.

[11] 3,717,804
[45] Feb. 20, 1973

[54] IN-LINE MOTOR HEATER CIRCUIT

[75] Inventors: Daumantas V. Dikinis, San Rafael; Moon H. Yuen, San Francisco, both of Calif.

[73] Assignee: Bechtel International Corporation, San Francisco, Calif.

[22] Filed: April 28, 1972

[21] Appl. No.: 248,745

[52] U.S. Cl. .................................318/436, 318/471
[51] Int. Cl. ..........H02b 1/02, H02b 9/00, H02b 5/04
[58] Field of Search .............................318/436, 471

[56] References Cited
UNITED STATES PATENTS 3,445,743  5/1969  Blair.......................................318/436
3,582,712  6/1971  Blair.......................................318/436

*Primary Examiner*—Benjamin Dobeck
*Attorney*—Eckhoff, Hoppe, Slick, Mitchell & Anderson

[57] ABSTRACT

A solid state circuit for maintaining the temperature of an ac motor winding at a desired level above ambient temperatures, including an electronic switch that conducts a small heating current while the motor is on standby, and control means for setting the firing angle of the electronic switch to maintain a winding temperature of at least 3° C. above ambient temperatures.

10 Claims, 3 Drawing Figures

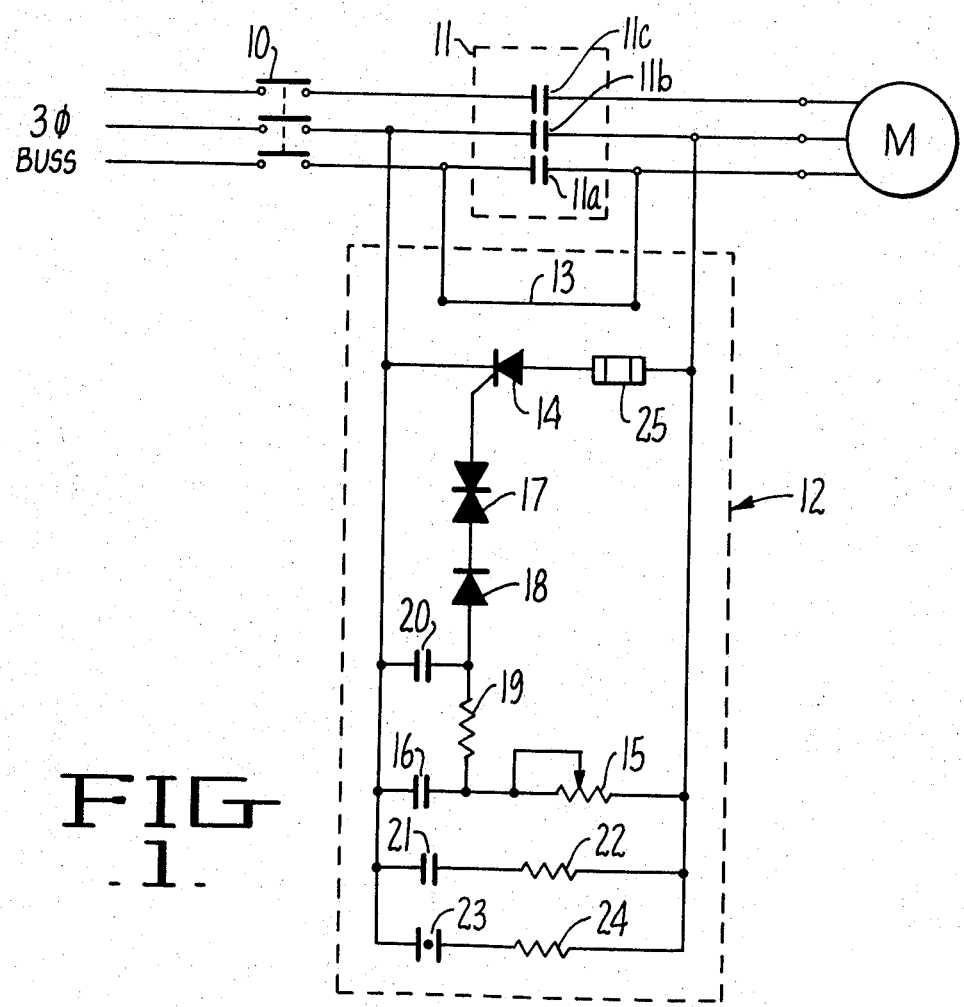
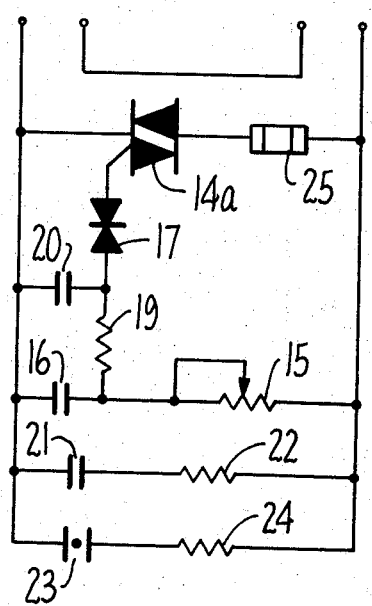
FIG. 1.
FIG. 2.

IN-LINE MOTOR HEATER CIRCUIT

This invention relates to motor heater devices that maintain the temperature of the motor windings from 3° to 15° C. above ambient temperatures. Such devices are, of course, well known and are used to protect motor windings from absorbing moisture while non-operating or on standby. In general, the prior art devices heat the motor windings with a relay controlled low-voltage systems, such as that disclosed in U.S. Pat. No. 3,445,743.

In brief, this invention provides a completely solid state circuit that may be connected in-line with an ac motor winding and used with conventional single or multiple phase motors and motor starter systems for 120 volts to 480 volts and 25 to 400 Hz. Circuits of the present invention are connected across two sets of motor starter contacts. When the motor is energized, the heater circuit is totally shorted and does not interfere with normal motor operations. However, when the motor is stopped, the heater circuit bypasses the motor starter contacts, which are then open, and conducts a small heating current through the motor winding. The current flow may be preset or adjusted to match the motor characteristics so that the winding temperature is maintained at least 3° C. above ambient temperatures.

One object of the present invention is to provide a motor heater circuit that is dependable and yet easy to install and maintain.

A second object is to provide a circuit for heating motor windings, particularly those of ac motors, and which is automatically connected in series with a motor winding when the motor is stopped or on standby.

A further object of the invention is to provide a circuit for heating motor windings and wherein the amount of current flow may be preset or adjusted to match the motor characteristics so as to maintain a winding temperature of at least 3° C. above ambient temperatures.

A still further object of the present invention is to provide a circuit for heating motor windings that may be assembled with solid state components, packaged as a unit and connected to motor starters and ac motors of conventional design.

Various other objects of the invention will become apparent in view of the following detailed description.

In the drawings forming a part of this application and in which like parts are identified by like reference numerals throughout the same, FIG. 1 is a schematic diagram of a preferred embodiment of the invention in a circuit for heating a motor winding of a three-phase motor;

FIG. 2 illustrates one portion of a second embodiment of the invention in a motor heater circuit; and FIG. 3 illustrates an alternate arrangement for heating a motor winding with the circuitry of either embodiment.

Referring to FIG. 1, motor M is adapted for connection to a three-phase buss through a set of manually operated contacts 10 and a conventional motor starter 11 including three sets of contacts 11a, 11b and 11c. All motor starter contacts are open as when the motor is shut down or on standby. In addition, and in accordance with the teaching of this invention, two windings of motor M connect to two lines of the buss or power supply through an in-line motor heater circuit 12. This circuit essentially comprises a shorting line 13 connected across one set of contacts 11a of the motor starter, a circuit means including an electronic switch 14 connected across a second pair of motor starter contacts 11b, and a control means for triggering switch 14 to a conducting state. Electronic switch 14, as shown, is a controlled half-wave ac switch that operates from a blocking state to a conducting state with positive gate triggering only. The control means for operating switch 14 consists of an R-C phase shifting circuit including a variable resistance 15 and a capacitor 16. The gate electrode of switch 14 connects to the control means through a voltage-limiting break-down diode 17, a blocking diode 18 and a current limiting resistance 19.

The values of resistance 15 and capacitor 16 are selected to close switch 14 for a predetermined time to produce a desired amount of current flow and maintain a winding temperature of at least 3° C. above ambient temperature. This necessarily requires a selection of values to produce a controlled firing that matches the characteristics of the motor. It will be readily appreciated that more heat is produced when switch 14 is conducting for greater portions of each half-wave cycle. Conversely, shorter periods of "on" time produce less heating of the motor winding. As a convenience measure, therefore, resistance 15 is preferably of a variable type so that the amount of phase shifting may be selected to match the motor heater circuitry to the motor winding.

In the preferred embodiment illustrated in FIG. 1, a small capacitor 20 is provided between the control means and a line contact to suppress transient voltage applied to the grid electrode. In addition, an R-C circuit comprising a capacitor 21 and a resistance 22 act to suppress transient voltages in the line. The embodiment of FIG. 1 also includes an indicator circuit comprising a neon tube 23 in series with a load resistance 24; and a protective fuse 25 is placed in series with the main electrodes of switch 14.

In operation, the in-line motor heater circuit 12 provides automatic, low power to the motor windings when the motor is turned off and motor starter contacts are all open. The current flow through the motor windings depend upon the firing angle of electronic switch 14 and this may be set or adjusted by selecting the value of resistance 15.

FIG. 2 of the drawings illustrates one portion of a second embodiment of the invention which is particularly useful with high horsepower motors where relatively large current flows are required to heat the motor winding. This embodiment of the invention differs from that of FIG. 1 in the use of a full-wave ac switch 14a, such as a triac, and the elimination of blocking diode 18. In all other respects the circuitry would be the same as that illustrated in FIG. 1. With this embodiment, switch 14a is triggered to a conductive state on both the positive and negative portions of each wave cycle, thereby doubling at the same firing angle the amount of current flow otherwise attained with the half-wave switch 14.

It will be noted that each of the two embodiments illustrated in FIGS. 1 and 2 make use of a shorting line 13 connected across motor starter contacts 11a. However, for safety reasons it may be necessary or desirable to employ a second in-line motor heater circuit in lieu of shorting line 13. FIG. 3 illustrates such an arrangement wherein a pair of half-wave ac switches 14 are operated from a block state to a conductive state with positive gate triggering only. Each of the switches 14 has its gate electrode connected to a separate control means including a pair of phase shifting R-C circuits. A pair of resistors 26a and 26b of high resistance values are connected across contacts 11a and 11b, respectively, to form a voltage divider that provides equal voltage to both firing circuits.

Although preferred embodiments of this invention have been illustrated and described, various modifications and changes may be resorted to without departing from the spirit of the invention or the scope of the attached claims, and each of such modifications and changes is contemplated.

What is claimed is:

1. In-line motor heater circuitry for use in combination with an ac motor and motor starter, comprising:

circuit means including an electronic switch having a pair of main electrodes and a gate electrode, said means for connecting the main electrodes across one set of motor starter contacts, and conducting a current through the winding of the motor while on standby, and control means connected to said gate electrode for triggering said electronic switch to a conducting state, said control means including means for setting the firing angle of said electronic switch to provide a desired current flow for maintaining a winding temperature of at least 3° C. above ambient temperature.

2. The circuitry of claim 1, said circuit means comprising a gate controlled full-wave ac switch having its gate electrode connected to said control means in series with a voltage-limiting breakdown diode.

3. The circuitry of claim 1, said switch comprising a gate controlled half-wave ac switch that operates from a blocking state to a conducting state with positive gate triggering only, said switch having its gate electrode connected to said control means in series with a voltage-limiting breakdown diode and a blocking diode.

4. The circuitry of claim 1, said means for setting the firing angle of said switch comprising an R-C circuit and means for connecting the R-C circuit across the one set of motor starter contacts, the characteristics of said R-C circuit being selected to produce a desired phase shift to control firing.

5. The circuitry of claim 1, and further comprising an R-C circuit connected across the one set of motor starter contacts for suppressing transient current flows in the lines.

6. The circuitry of claim 1, and in further comprising a neon tube connected in series with a resistor across the one set of motor starter contacts to indicate whether said electronic switch is conducting.

7. The circuitry of claim 1, said means for setting the firing angle of said switch comprising an R-C circuit connected across the one set of motor starter contacts including a variable resistor, said variable resistor being set to produce a desired phase shift to control firing and maintain a selected winding temperature for the motor to which the in-line motor heater is applied.

8. In combination with an ac motor and a motor starter having first and second sets of contacts for connecting a winding of said motor to two lines of a power supply, a solid state in-line motor heater circuit for maintaining the temperature of the motor winding at a desired level above ambient temperature while the motor is on standby, said motor heater circuit comprising circuit means for conducting a current flow through the motor winding and bypassing said first and second sets of contacts, a first electronic switch having a pair of main electrodes and a gate electrode, said main electrodes being connected across said first set of motor starter contacts, and control means connected to said gate electrode for triggering said electronic switch to a conducting state, said control means including means for setting the firing angle of said electronic switch to provide a desired current flow for maintaining the temperature of the motor winding at least 3° C. above ambient temperature.

9. The combination of claim 8, said circuit means including a short line connected across said second set of motor starter contacts.

10. The combination of claim 8, said heating circuit including a second electronic switch having a pair of main electrodes and a gate electrode, said main electrodes being connected across said second set of motor starter contacts, and control means connected to the gate electrode of said second switch for triggering said second electronic switch to a conducting state, said control means including means for setting the firing angle of said second electronic switch to operate in combination with said first electronic switch and provide a desired current flow for maintaining the temperature of the motor winding.

* * * * *